(12) United States Patent
Lee

(10) Patent No.: US 9,656,622 B2
(45) Date of Patent: May 23, 2017

(54) APPARATUS FOR FIXING PIPE OF VEHICLE

(71) Applicant: Kia Motors Corporation, Seoul (KR)

(72) Inventor: Won Man Lee, Gyunggi-Do (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 14/959,176

(22) Filed: Dec. 4, 2015

(65) Prior Publication Data

US 2016/0368439 A1 Dec. 22, 2016

(30) Foreign Application Priority Data

Jun. 22, 2015 (KR) ........................ 10-2015-0088628

(51) Int. Cl.
| | | |
|---|---|---|
| *F16L 3/00* | (2006.01) | |
| *B60R 16/08* | (2006.01) | |
| *F16L 3/137* | (2006.01) | |
| *F16L 55/02* | (2006.01) | |
| *B60H 1/00* | (2006.01) | |
| *H02G 3/04* | (2006.01) | |
| *H02G 3/00* | (2006.01) | |

(52) U.S. Cl.
CPC ......... *B60R 16/08* (2013.01); *B60H 1/00571* (2013.01); *F16L 3/137* (2013.01); *F16L 55/02* (2013.01); *H02G 3/0431* (2013.01); *H02G 3/26* (2013.01)

(58) Field of Classification Search
CPC ......... F16L 3/137; F16L 55/02; F16L 59/135; B60R 16/08; B60H 1/00571; H02G 3/0431; H02G 3/26

USPC ....... 248/62, 74.3, 73; 174/68.1, 72 A, 71 R, 174/72 R, 68.3

See application file for complete search history.

(56) References Cited

U.S. PATENT DOCUMENTS

| | | | | |
|---|---|---|---|---|
| 1,805,006 A | * | 5/1931 | Neilon .................. | F16L 3/1075 248/62 |
| 4,991,801 A | * | 2/1991 | Trumbull ................. | F16L 3/13 248/62 |
| 8,870,132 B2 | * | 10/2014 | Sampson ................ | F16L 3/123 248/62 |

FOREIGN PATENT DOCUMENTS

| | | |
|---|---|---|
| JP | 2561405 Y2 | 10/1997 |
| KR | 20-0436382 Y1 | 8/2007 |
| KR | 10-2009-0022489 A | 3/2009 |

* cited by examiner

*Primary Examiner* — Todd M Epps
(74) *Attorney, Agent, or Firm* — Morgan Lewis & Bockius LLP

(57) ABSTRACT

An apparatus for fixing a pipe of a vehicle may include: a clip adapted that a fixation hole and an assembly hole are formed at a first end thereof and a mounting portion is formed in a hollow cylindrical shape at a second end thereof bent and extended from the first end to insert the pipe into the hollow; a first rubber member being fixed to a vehicle body by a bush on a state of being inserted into the fixation hole of the clip; a second rubber member being inserted into the hollow of the mounting portion on a state of surrounding the pipe; and an insulation member adapted that a first side thereof is inserted into the assembly hole and a second side thereof formed in a bellows shape is supported to the vehicle body.

10 Claims, 6 Drawing Sheets

APPARATUS FOR FIXING PIPE OF VEHICLE

CROSS-REFERENCE TO RELATED APPLICATION

The present application claims priority to and the benefit of Korean Patent Application No. 10-2015-0088628 filed on Jun. 22, 2015, the entire contents of which is incorporated herein for all purposes by this reference.

BACKGROUND OF THE INVENTION

Field of the Invention

The present invention relates to an apparatus for fixing a pipe of a vehicle. More particularly, the present invention relates to an apparatus for fixing a pipe of a vehicle configured to prevent that vibration is delivered to a vehicle body through a pipe.

Description of Related Art

Generally, a pipe functions as a passage for circulating fluid.

In a vehicle, a pipe which is provided for circulating fluid such as coolant, refrigerant, oil may be fixed to a vehicle body by an additional fixing apparatus.

Problem by vibration and noise may occur if the pipe fixing apparatus is not able to suppress that vibration of the pipe is intactly delivered to a vehicle body.

For instance, vibration of an engine being delivered to a compressor which is mounted to the engine, vibration of the compressor, vibration by stream velocity of refrigerant passing through a pipe, and so on may be delivered to vehicle body in a cooling system.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for fixing a pipe of a vehicle having advantages of maximally preventing that vibration of a pipe is delivered to a vehicle body.

An apparatus for fixing a pipe of a vehicle according to an exemplary embodiment of the present invention may include: a clip adapted that a fixation hole and an assembly hole are formed at one end thereof and a mounting portion is formed in a hollow cylindrical shape at the other end thereof bent and extended from the one end so as to insert the pipe into the hollow; a first rubber member being fixed to a vehicle body by a bush on a state of being inserted into the fixation hole of the clip; a second rubber member being inserted into the hollow of the mounting portion on a state of surrounding the pipe; and an insulation member adapted that one side thereof is inserted into the assembly hole and the other side thereof formed in a bellows shape is supported to the vehicle body.

The clip may be formed in a shape that overlapping two plates are bent and the mounting portion may be extended from one of the two plates to the other one of two plates so as to form a cylindrical shape.

A penetration hole bored to a radial direction may be formed along a circumference by a set section at the mounting portion and a protrusion to be protruded in a shape to correspond with the penetration hole may be formed at an exterior circumference of the second rubber member so as to be sat in the penetration hole.

A plurality of bead to be radially protruded may be formed at an interior circumference of the second rubber member surrounding the pipe.

A protruded rim to be protruded toward a radial direction may be respectively formed at both ends of the second rubber member so as to be supported to both ends of the mounting portion.

A gap may be formed at the second rubber member to be cut from an exterior circumference thereof to a hollow thereof.

The insulation member may be made of a rubber material.

The one side of the insulation member being inserted into the assembly hole may be formed in a cone shape.

At least one air hole may be formed at the other side of the insulation member formed in a bellows shape.

The air hole may be closed when the other side of the insulation member is contracted.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
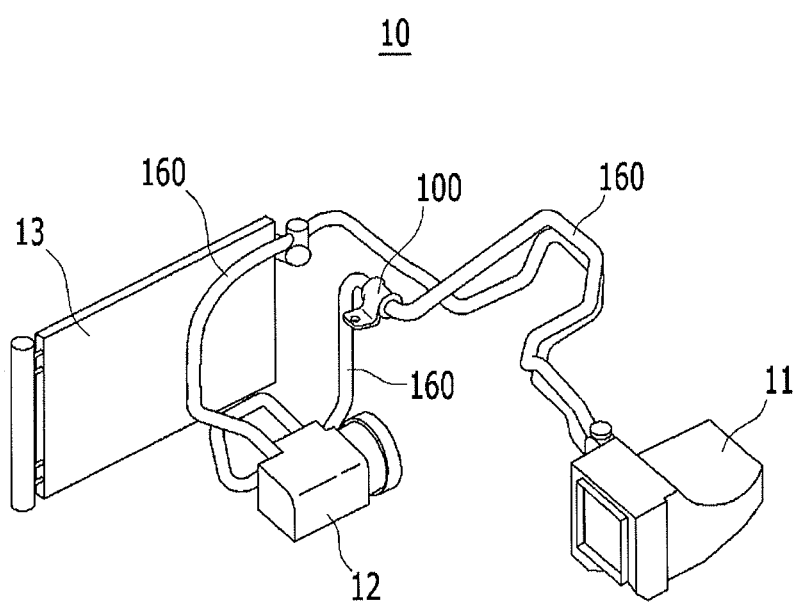
FIG. 1 is a schematic view of a general room cooling system for a vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a schematic view of a general room cooling system for a vehicle.

As shown in FIG. 1, a general room cooling system 10 for a vehicle is configured to include an evaporator 11, a compressor 12, a condenser 13, and so on.

The general operation of the room cooling system 10 so that refrigerant is evaporated, compressed, condensed, or distended during being circulated via the evaporator 11, the compressor 12, the condenser 13, and so on is well known to a person of ordinary skill in the art, a detailed description thereof will be omitted.

Meanwhile, the members such that the evaporator 11, the compressor 12, and the condenser 13 are connected with each other by a pipe 160 such that refrigerant is circulated.

The pipe 160 is fixed to a vehicle body by fixing apparatus 100.

An apparatus for fixing a pipe of a vehicle according to an exemplary embodiment of the present invention relates to the fixing apparatus 100 which is adapted to absorb vibration of various pipes 160 provided to a vehicle so as to suppress noise and to maintain a mounting position of constituent element. A pipe 160 of a room cooling system is illustrated in FIG. 1 for better understanding, the pipe 160 and the pipe fixing apparatus 100 according to an exemplary embodiment of the present invention are not limited thereto.

Figure 2:
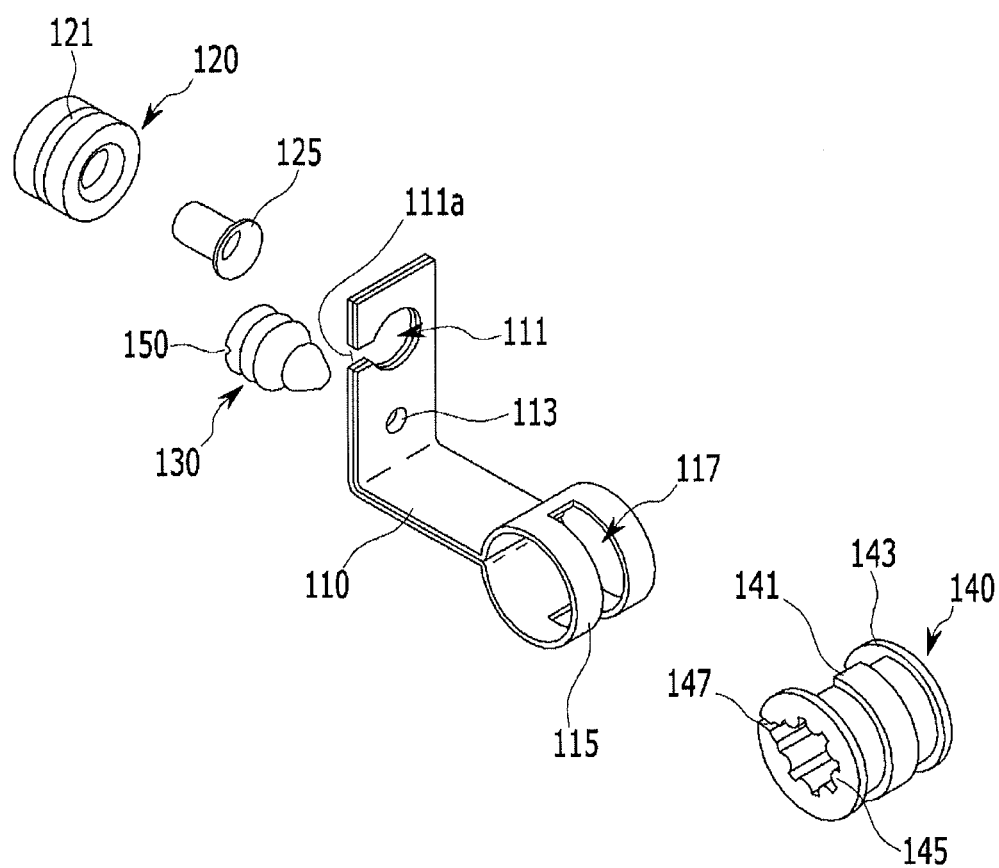
FIG. 2 is an exploded perspective view of an apparatus for fixing a pipe of a vehicle according to an exemplary embodiment of the present invention.
Figure 3:
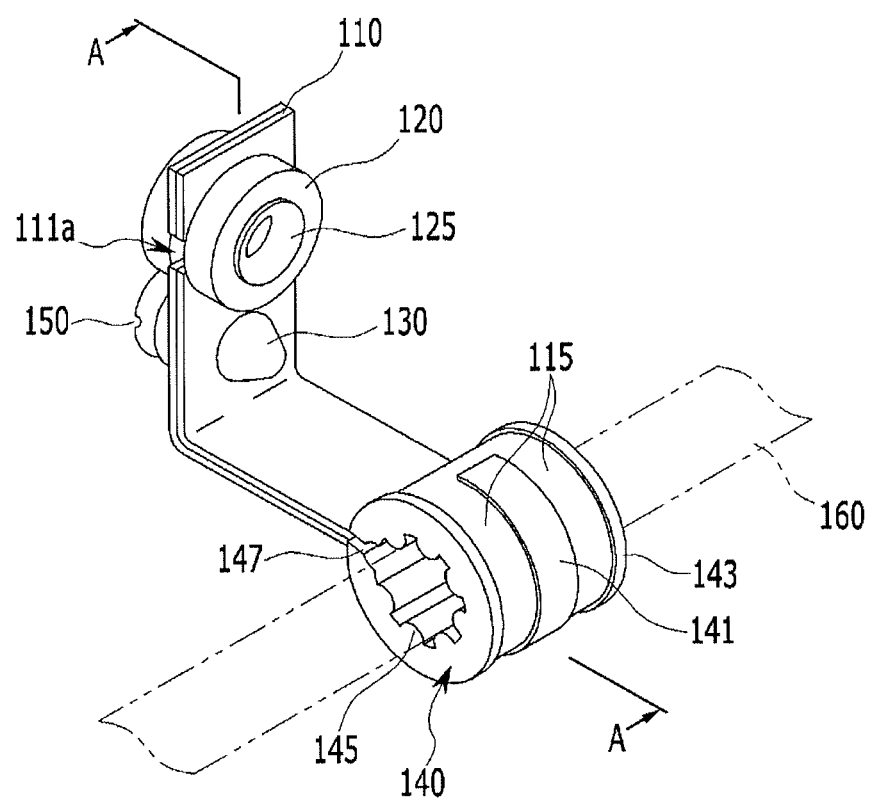
FIG. 3 is an assemble perspective view of an apparatus for fixing a pipe of a vehicle according to an exemplary embodiment of the present invention.
Figure 4:
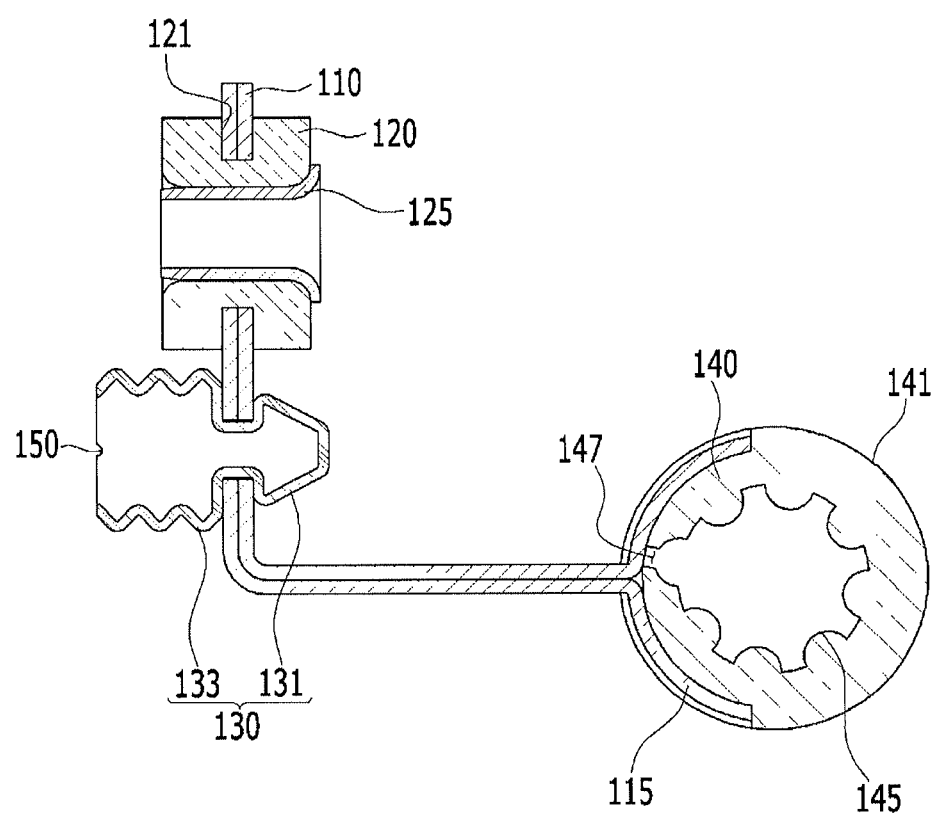
FIG. 4 is a cross-sectional view taken along a line A-A in FIG. 3.

FIG. 2 is an exploded perspective view of an apparatus for fixing a pipe of a vehicle according to an exemplary embodiment of the present invention, FIG. 3 is an assemble perspective view of an apparatus for fixing a pipe of a vehicle according to an exemplary embodiment of the present invention, and FIG. 4 is a cross-sectional view taken along a line A-A in FIG. 3.

As shown in FIG. 2 to FIG. 4, an apparatus 100 for fixing a pipe of a vehicle according to an exemplary embodiment of the present invention includes a clip 110, a first rubber member 120, an insulation member 130, and a second rubber member 140.

The clip 110 is formed in a shape that overlapping two plates are bent. In addition, the first rubber member 120, the insulation member 130, and the second rubber member 140 may be made of a rubber material.

A fixation hole 111 and an assembly hole 113 are formed at one end of the clip 110. In addition, a mounting portion 115 is formed at the other end of the clip 110 bent and extended from the one end of the clip 110.

The fixation hole 111 may be a circle hole. In addition, one side of an external circumference of the fixation hole 111 is opened. Herein, a portion which is cut so as to open the one side of the external circumference of the fixation hole 111 will be called "cutting portion 111a".

The assembly hole 113 may be a circle hole. In addition, the assembly hole 113 is formed by a size to be smaller than the fixation hole 111.

The mounting portion 115 is formed in a hollow cylindrical shape such that the pipe 160 is inserted and fixed thereto. In addition, the mounting portion 115 is extended from one plate to the other plate in the other end of the clip 110 so as to form a cylindrical shape. That is, one plate is made to form the mounting portion 115 having the cylindrical shape and the clip 110 having the bent shape. Further, a penetration hole 117 bored to a radial direction is formed at the mounting portion 115 by a set section along a circumference thereof.

Meanwhile, the fixation hole 111 and the assembly hole 113 are formed by only one process in the clip 110 overlapping two plates.

The first rubber member 120 is formed in a cylindrical shape so as to be mounted to the fixation hole 11 and a fixation groove 121 is formed along an external circumference of the first rubber member 120. That is, an external circumference of the fixation groove 121 is sat on an internal circumference of the fixation hole 111 of the clip 110. Further, the first rubber member 120 is mounted to the fixation hole 111 through the cutting portion 111a.

The first rubber member 120 supports the clip 110 which is disposed apart from a vehicle body on a state of being mounted to the fixation hole 111 of the clip 110. At this time, the first rubber member 120 is fixed to a vehicle body by a bush 125 which penetrates a center of the first rubber member 120.

The insulation member 130 includes an assembly portion 131 and an elastic portion 133.

The assembly portion 131 is formed in a cone shape so as to be easily inserted into the assembly hole 113 of the clip 110. That is, the assembly portion 131 is inserted into and penetrated to the assembly hole 113 of the clip 110 such that the insulation member 130 is mounted to the clip 110.

The elastic portion 133 is integrally formed with the assembly portion 131 in a bellows shape. In addition, the elastic portion 133 elastically supports the one end of the clip 110 to a vehicle body. Therefore, the insulation member 130 prevents that vibration being delivered to the clip 110 through the pipe 160 is directly delivered to a vehicle body.

At least one air hole 150 is formed at the elastic portion 133 such that it is easy to elastically transform. The air hole 150 is a passage for passing air in and out to interior and exterior of the elastic portion 133 according to elastic transformation of the elastic portion 133 by vibration of the clip 110.

The second rubber member 140 is formed in a hollow cylindrical shape so as to be inserted to the mounting portion 115 such that the pipe 160 is inserted into the hollow of the second rubber member 140. In addition, a protrusion 141 having a shape to correspond with the penetration hole 117 is formed at an exterior circumference of the second rubber member 140. That is, the second rubber member 140 is adapted that the protrusion 141 is inserted to the mounting portion 115 of the clip 110 so as to be sat on the penetration hole 117 such that the second rubber member 140 is not spun with the mounting portion 115. Further, a protruded rim 143 is respectively formed at both ends in an axial direction of the second rubber member 140 so that a radius of the protruded rim 143 is longer than a radius of an external circumference of the second rubber member 140. The protruded rim 143 prevents together with the protrusion 141 that the second rubber member 140 is escaped from the mounting portion 115.

In the hollow of the second rubber member 140, a plurality of bead 145 is radially protruded from an interior circumference. The bead 145 is smoothly transformed so as to fix the pipe 160.

A gap 147 is formed to be cut from the exterior circumference to the hollow of the second rubber member 140. The gap 147 is provided for inserting the second rubber member 140 to the mounting portion 115.

Meanwhile, the pipe 160 is inserted to the second rubber member 140 before the second rubber member 140 is mounted to the mounting portion 115.

As mentioned above, an apparatus 100 for fixing a pipe of a vehicle according to an exemplary embodiment of the present invention is adapted to fix the pipe 160 to the mounting portion 115 of the clip 110 by using the second rubber member 140, to fix the clip 110 to a vehicle body by using the first rubber member 120, and to elastically support the clip 110 to a vehicle body by using the insulation member 130.

Therefore, an apparatus 100 for fixing a pipe of a vehicle according to an exemplary embodiment of the present invention is adapted to insulate vibration being delivered from the pipe 160 to the clip 110 by the first rubber member 120 and the second rubber member 140 and to insulate vibration of the clip 110 by operation of the insulation member 130.

Figure 5A:
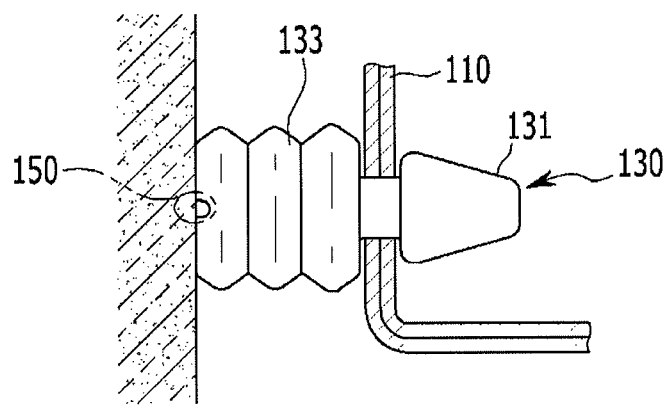
FIG. 5A and FIG. 5B are diagrams illustrating operations of an insulation member being applied to an apparatus for fixing a pipe of a vehicle according to an exemplary embodiment of the present invention.
Figure 5B:
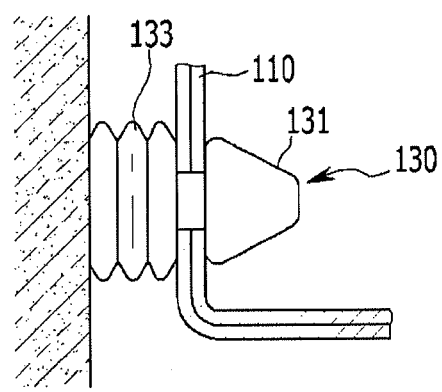

FIG. 5A and FIG. 5B are diagrams illustrating operations of an insulation member being applied to an apparatus for fixing a pipe of a vehicle according to an exemplary embodiment of the present invention.

As shown in FIG. 5A, in case that vibration of the clip 110 is slight, the elastic portion 133 of the insulation member 130 is not greatly transformed and the state of opening the air hole 150 is maintained.

Thus, air easily passes in and out through the air hole 150 such that vibration of the clip 110 is insulated by elastic transformation of the elastic portion 133.

As shown in FIG. 5B, in case that vibration of the clip 110 is great, the air hole 150 is closed as the elastic portion 133 of the insulation member 130 is greatly transformed.

Thus, the elastic portion 133 blocks that the clip 110 is contacted to a vehicle body and simultaneously air pressure is generated in interior the insulation member 130 so as to improve insulation effect.

According to an exemplary embodiment of the present invention, the apparatus 100 for fixing a pipe of a vehicle can suppress vibration of the clip 110 by operation of the insulation member 130 which is formed in the bellows shape. Furthermore, it may be minimized that vibration the pipe 160 is delivered to a vehicle body as vibration of the pipe 160 is insulated by three elements such as the first rubber member 120, the second rubber member 140, and the insulation member 130.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for fixing a pipe of a vehicle comprising:
a clip adapted that a fixation hole and an assembly hole are formed at a first end thereof and a mounting portion is formed in a hollow cylindrical shape at a second end thereof bent and extended from the first end to insert the pipe into the hollow;
a first rubber member being fixed to a vehicle body by a bush on a state of being inserted into the fixation hole of the clip;
a second rubber member being inserted into the hollow of the mounting portion on a state of surrounding the pipe; and
an insulation member adapted that a first side thereof is inserted into the assembly hole and a second side thereof formed in a bellows shape is supported to the vehicle body.

2. The apparatus of claim 1, wherein the clip is formed in a shape that overlapping two plates are bent and the mounting portion is extended from one of the two plates to the other one of two plates to form a cylindrical shape.

3. The apparatus of claim 1, wherein a penetration hole bored to a radial direction is formed along a circumference by a set section at the mounting portion and a protrusion to be protruded in a shape to correspond with the penetration hole is formed at an exterior circumference of the second rubber member to be sat in the penetration hole.

4. The apparatus of claim 1, wherein a plurality of bead to be radially protruded are formed at an interior circumference of the second rubber member surrounding the pipe.

5. The apparatus of claim 1, wherein a protruded rim to be protruded toward a radial direction is respectively formed at both ends of the second rubber member to be supported to both ends of the mounting portion.

6. The apparatus of claim 1, wherein a gap is formed at the second rubber member to be cut from an exterior circumference thereof to a hollow thereof.

7. The apparatus of claim 1, wherein the insulation member is made of a rubber material.

8. The apparatus of claim 1, wherein the first side of the insulation member being inserted into the assembly hole is formed in a cone shape.

9. The apparatus of claim 1, wherein at least one air hole is formed at the second side of the insulation member formed in a bellows shape.

10. The apparatus of claim 9, wherein the air hole is closed when the second side of the insulation member is contracted.

* * * * *